United States Patent
Ahern et al.

(10) Patent No.: US 7,734,852 B1
(45) Date of Patent: Jun. 8, 2010

(54) MODULAR COMPUTER SYSTEM

(76) Inventors: Frank W. Ahern, 6233 E. Janiceway, Scottsdale, AZ (US) 85254; Desi Rhoden, 3412 E. Suncrest Ct., Phoenix, AZ (US) 85044; Jeff Doss, 18652 N. 39$^{th}$ St., Phoenix, AZ (US) 85050; Charles Mollo, 13602 N. 44$^{th}$ St. #181, Phoenix, AZ (US) 85032

( * ) Notice: Subject to any disclaimer, the term of this patent is extended or adjusted under 35 U.S.C. 154(b) by 0 days.

(21) Appl. No.: 09/559,678

(22) Filed: Apr. 27, 2000

Related U.S. Application Data (63) Continuation-in-part of application No. 09/130,057, filed on Aug. 6, 1998, now Pat. No. 6,088,752, and a continuation-in-part of application No. 09/130,058, filed on Aug. 6, 1998, now Pat. No. 6,070,214.

(60) Provisional application No. 60/198,317, filed on Apr. 19, 2000.

(51) Int. Cl.
  *G06F 13/00* (2006.01)
(52) U.S. Cl. .................. 710/100; 710/305; 710/306
(58) Field of Classification Search ................ 710/100, 710/104, 300, 30, 305–306, 71; 709/208; 711/170, 172; 712/28, 29
See application file for complete search history.

(56) References Cited

U.S. PATENT DOCUMENTS 3,800,097 A   3/1974   Maruscak et al.

(Continued)

FOREIGN PATENT DOCUMENTS

CN    1473292    2/2004

(Continued)

OTHER PUBLICATIONS

Brochure entitled "Card Station Expanding Your Portable World" Axonix Corporation 1994.

(Continued)

*Primary Examiner*—Clifford H Knoll
*Assistant Examiner*—Kim T Huynh (57) ABSTRACT

A modular computer system (20) including a universal connectivity station (UCS) (22) interconnected to a plurality of remote modules (30, 32, 34, 36, 38, 42) via a plurality of respective high speed serial links (26, 40) such as based on proprietary Split-Bridge™ technology. The plurality modules, including a processor module (42) which may include core parts including a CPU, memory, AGP Graphics, and system bus interface may be remotely located from each of the other modules, including the UCS (22). The present invention achieves technical advantages wherein each module of the modular computer system (20) appear to each device to be interconnected to the other on a parallel bus since the high speed serial links appear transparent. Preferably, although not necessary, each of the modules including the UCS 22 are based on the PCI bus architecture, or the PCM-CIA bus architecture, although other bus architectures are well suited to be incorporated using the present invention. The processor module can be upgraded to change or improve the performance of the modular computer system 20 without requiring any changes to the remaining system, thus drastically improving the price to performance trade-offs of the system. Moreover, the operating system (OS) of each module, including both the software and hardware, do not need to be changed as the entire modular system (20) is based on a common architecture, such as the PCI or Cardbus bus architecture.

52 Claims, 3 Drawing Sheets

Modular Computer System

U.S. PATENT DOCUMENTS

| | | | |
|---|---|---|---|
| 4,112,369 A * | 9/1978 | Forman et al. | 380/44 |
| 4,413,319 A | 11/1983 | Schultz et al. | |
| 4,504,927 A | 3/1985 | Callan | |
| 4,535,421 A * | 8/1985 | Duwel et al. | 710/71 |
| 4,591,660 A | 5/1986 | Scordo | |
| 4,787,029 A | 11/1988 | Khan | |
| 4,882,702 A | 11/1989 | Struger et al. | |
| 4,901,308 A * | 2/1990 | Deschaine | 370/267 |
| 4,941,845 A | 7/1990 | Eppley et al. | |
| 4,954,949 A | 9/1990 | Rubin | |
| 4,959,833 A | 9/1990 | Mercola et al. | |
| 4,961,140 A | 10/1990 | Pechanek et al. | |
| 4,969,830 A | 11/1990 | Daly et al. | |
| 5,006,981 A | 4/1991 | Beltz et al. | |
| 5,038,320 A | 8/1991 | Heath et al. | |
| 5,111,423 A | 5/1992 | Kopec, Jr. et al. | |
| 5,134,702 A * | 7/1992 | Charych et al. | 710/71 |
| 5,187,645 A | 2/1993 | Spalding et al. | |
| 5,191,653 A | 3/1993 | Banks et al. | |
| 5,191,657 A | 3/1993 | Ludwig et al. | |
| 5,237,690 A | 8/1993 | Bealkowski et al. | |
| 5,274,711 A | 12/1993 | Rutledge et al. | |
| 5,301,349 A | 4/1994 | Nakata et al. | |
| 5,313,589 A * | 5/1994 | Donaldson et al. | 710/30 |
| 5,325,491 A | 6/1994 | Fasig | |
| 5,335,326 A | 8/1994 | Nguyen et al. | |
| 5,335,329 A | 8/1994 | Cox et al. | |
| 5,357,621 A * | 10/1994 | Cox | 711/172 |
| 5,373,149 A | 12/1994 | Rasmussen | |
| 5,377,184 A | 12/1994 | Beal et al. | |
| 5,430,847 A | 7/1995 | Bradley et al. | |
| 5,432,916 A | 7/1995 | Hahn et al. | |
| 5,440,698 A | 8/1995 | Sindhu et al. | |
| 5,446,869 A | 8/1995 | Padgett et al. | |
| 5,452,180 A | 9/1995 | Register et al. | |
| 5,457,785 A | 10/1995 | Kikinis et al. | |
| 5,469,545 A | 11/1995 | Vanbuskirk et al. | |
| 5,475,818 A | 12/1995 | Molyneaux et al. | |
| 5,477,415 A | 12/1995 | Mitcham et al. | |
| 5,483,020 A | 1/1996 | Hardie et al. | |
| 5,488,705 A | 1/1996 | LaBarbera | |
| 5,495,569 A | 2/1996 | Kotzur | |
| 5,497,498 A | 3/1996 | Taylor | |
| 5,507,002 A | 4/1996 | Heil | |
| 5,517,623 A | 5/1996 | Farrell et al. | |
| 5,522,050 A | 5/1996 | Amini et al. | |
| 5,524,252 A | 6/1996 | Desai et al. | |
| 5,530,895 A | 6/1996 | Enstrom | |
| 5,540,597 A | 7/1996 | Budman et al. | |
| 5,542,055 A | 7/1996 | Amini et al. | |
| 5,548,730 A | 8/1996 | Young et al. | |
| 5,555,510 A | 9/1996 | Verseput et al. | |
| 5,561,806 A | 10/1996 | Fitchett et al. | |
| 5,572,525 A | 11/1996 | Shen et al. | |
| 5,572,688 A | 11/1996 | Sytwu | |
| 5,579,489 A | 11/1996 | Dornier et al. | |
| 5,579,491 A | 11/1996 | Jeffries et al. | |
| 5,586,265 A | 12/1996 | Beukema | |
| 5,590,377 A | 12/1996 | Smith | |
| 5,611,053 A | 3/1997 | Wu et al. | |
| 5,632,020 A | 5/1997 | Gephardt et al. | |
| 5,634,080 A | 5/1997 | Kikinis et al. | |
| 5,655,142 A | 8/1997 | Gepharadt et al. | |
| 5,671,421 A | 9/1997 | Kardach et al. | |
| 5,694,556 A | 12/1997 | Neal et al. | |
| 5,696,911 A | 12/1997 | Fredriksson | |
| 5,696,949 A | 12/1997 | Young | |
| 5,701,483 A | 12/1997 | Pun | |
| 5,724,529 A | 3/1998 | Smith et al. | |
| 5,736,968 A | 4/1998 | Tsakiris et al. | |
| 5,748,921 A | 5/1998 | Lambrecht et al. | |
| 5,764,924 A * | 6/1998 | Hong | 710/300 |
| 5,774,681 A | 6/1998 | Kunishige | |
| 5,781,747 A | 7/1998 | Smith et al. | |
| 5,793,995 A | 8/1998 | Riley et al. | |
| 5,793,996 A | 8/1998 | Childers et al. | |
| 5,799,207 A | 8/1998 | Wang et al. | |
| 5,802,055 A | 9/1998 | Krein et al. | |
| 5,809,262 A | 9/1998 | Potter | |
| 5,815,677 A | 9/1998 | Goodrum | |
| 5,819,053 A | 10/1998 | Goodrum et al. | |
| 5,832,279 A | 11/1998 | Rostoker et al. | |
| 5,835,741 A | 11/1998 | Elkhoury et al. | |
| 5,854,908 A | 12/1998 | Ogilvie et al. | |
| 5,884,027 A | 3/1999 | Garbus et al. | |
| 5,905,870 A | 5/1999 | Mangin et al. | |
| 5,911,055 A | 6/1999 | Whiteman et al. | |
| 5,913,037 A * | 6/1999 | Spofford et al. | 709/226 |
| 5,941,965 A * | 8/1999 | Moroz et al. | 710/303 |
| 5,948,076 A | 9/1999 | Anubolu et al. | |
| 5,953,511 A | 9/1999 | Sescila et al. | |
| 5,968,144 A | 10/1999 | Walker et al. | |
| 5,991,304 A | 11/1999 | Abramson | |
| 5,991,839 A | 11/1999 | Ninomiya | |
| 6,003,105 A | 12/1999 | Vicard et al. | |
| 6,026,075 A | 2/2000 | Linville et al. | |
| 6,031,821 A | 2/2000 | Kalkunte et al. | |
| 6,035,333 A | 3/2000 | Jeffries et al. | |
| 6,044,215 A | 3/2000 | Charles et al. | |
| 6,058,144 A | 5/2000 | Brown | |
| 6,070,214 A | 5/2000 | Ahern | |
| 6,084,856 A | 7/2000 | Simmons et al. | |
| 6,085,278 A | 7/2000 | Gates et al. | |
| 6,098,103 A | 8/2000 | Dreyer et al. | |
| 6,101,563 A | 8/2000 | Fields, Jr. et al. | |
| 6,115,356 A | 9/2000 | Kalkunte et al. | |
| 6,141,744 A | 10/2000 | Wing So | |
| 6,157,967 A | 12/2000 | Horst et al. | |
| 6,167,029 A | 12/2000 | Ramakrishnan | |
| 6,167,120 A * | 12/2000 | Kikinis | 379/90.01 |
| 6,170,022 B1 | 1/2001 | Linville et al. | |
| 6,201,829 B1 | 3/2001 | Schneider | |
| 6,216,185 B1 * | 4/2001 | Chu | 710/303 |
| 6,222,825 B1 | 4/2001 | Mangin et al. | |
| 6,233,639 B1 * | 5/2001 | Dell et al. | 710/301 |
| 6,237,046 B1 * | 5/2001 | Ohmura et al. | 710/1 |
| 6,247,086 B1 | 6/2001 | Allingham | |
| 6,247,091 B1 | 6/2001 | Lovett | |
| 6,256,691 B1 * | 7/2001 | Moroz et al. | 710/303 |
| 6,260,092 B1 * | 7/2001 | Story et al. | 710/315 |
| 6,263,385 B1 | 7/2001 | Gulick et al. | |
| 6,263,397 B1 | 7/2001 | Wu et al. | |
| 6,275,888 B1 | 8/2001 | Porterfield | |
| 6,295,281 B1 | 9/2001 | Itkowsky et al. | |
| 6,333,929 B1 | 12/2001 | Drottar et al. | |
| 6,366,951 B1 * | 4/2002 | Schmidt | 709/208 |
| 6,381,661 B1 | 4/2002 | Messerly et al. | |
| 6,385,671 B1 | 5/2002 | Hunsaker et al. | |
| 6,401,157 B1 * | 6/2002 | Nguyen et al. | 710/302 |
| 6,418,492 B1 | 7/2002 | Papa | |
| 6,418,494 B1 | 7/2002 | Shatas et al. | |
| 6,418,504 B2 | 7/2002 | Conway et al. | |
| 6,421,352 B1 | 7/2002 | Manaka et al. | |
| 6,425,033 B1 | 7/2002 | Conway et al. | |
| 6,430,635 B1 * | 8/2002 | Kwon et al. | 710/104 |
| 6,445,711 B1 | 9/2002 | Scheel et al. | |
| 6,446,192 B1 * | 9/2002 | Narasimhan et al. | 712/29 |
| 6,452,927 B1 * | 9/2002 | Rich | 370/395.1 |
| 6,456,590 B1 | 9/2002 | Ren et al. | |
| 6,457,081 B1 | 9/2002 | Gulick | |
| 6,457,091 B1 | 9/2002 | Lange et al. | |
| 6,473,810 B1 | 10/2002 | Patel et al. | |
| 6,493,745 B1 | 12/2002 | Cherian | |
| RE37,980 E | 2/2003 | Elkhoury et al. | |

| | | | |
|---|---|---|---|
| 6,567,876 B1 | 5/2003 | Stufflebeam |
| 6,578,101 B1 | 6/2003 | Ahern |
| 6,581,125 B1 | 6/2003 | Lange et al. |
| 6,594,719 B1 | 7/2003 | Ahern et al. |
| 6,671,737 B1 | 12/2003 | Snowdon et al. |
| 6,715,022 B1 | 3/2004 | Ahern |
| 6,728,822 B1 | 4/2004 | Sugawara et al. |
| 6,778,543 B1 | 8/2004 | Frouin et al. |
| 6,788,101 B1 | 9/2004 | Rahman |
| 6,950,440 B1 | 9/2005 | Conway |
| 7,047,326 B1 | 5/2006 | Crosbie et al. |
| 7,269,680 B1 | 9/2007 | Ahern |
| 7,356,634 B2 | 4/2008 | Ahern |
| 7,657,678 B2 | 2/2010 | Ahern |
| 2001/0011312 A1 | 8/2001 | Chu |
| 2001/0037423 A1 | 11/2001 | Conway et al. |
| 2002/0078289 A1 | 6/2002 | Morrow |
| 2002/0135536 A1 | 9/2002 | Bruning |
| 2003/0120849 A1 | 6/2003 | Roslak et al. |
| 2004/0024809 A1 | 2/2004 | Edwards et al. |
| 2004/0054757 A1 | 3/2004 | Ueda et al. |
| 2004/0088452 A1 | 5/2004 | Scott |
| 2005/0036509 A1 | 2/2005 | Acharya et al. |
| 2005/0129385 A1 | 6/2005 | Speasl et al. |
| 2005/0174488 A1 | 8/2005 | Chennakeshu |
| 2006/0075166 A1 | 6/2006 | Grassian et al. |

FOREIGN PATENT DOCUMENTS

| | | |
|---|---|---|
| DE | 19829212 | 1/2000 |
| EP | 0 588 030 A2 | 3/1994 |
| EP | 0817088 | 1/1998 |
| EP | 0820021 | 1/1998 |
| EP | 0844567 | 5/1998 |
| EP | 1374024 | 1/2004 |
| JP | 02-140852 | 5/1990 |
| JP | 3253960 | 11/1991 |
| JP | 06-028307 | 2/1994 |
| JP | 3001429 | 2/1994 |
| JP | 59184903 | 10/1994 |
| JP | 9081504 | 3/1997 |
| JP | 9097125 | 4/1997 |
| JP | 09097125 | 4/1997 |
| JP | 10049379 | 2/1998 |
| JP | 10124451 | 5/1998 |
| JP | 2003050661 | 2/2003 |
| JP | 2004531803 | 10/2004 |
| WO | WO/93/02420 | 2/1993 |
| WO | WO01/61513 | 8/2001 |
| WO | WO-0161512 | 8/2001 |
| WO | WO-0161513 | 8/2001 |
| WO | WO-02077785 | 10/2002 |

OTHER PUBLICATIONS

Anderson, et al "CardBus System Architecture" pp. 150-153, 194-201, 228-231, 322-325, 1995.

Anderson, Don "PCMCIA System Architecture" 16-Bit PC Cards, $2^{nd}$ Edition, pp. 146-167, 214-215, 218-225, 296-297, 1995.

Kitamura, et al "Design of the ISDN PC Card" NTT Human Interface Laboratory, Japan pp. 1169-1174, 1994.

Adaptec, "Hardware Installation Guide" CardPark APA-4510, ISA-to-PCMCIA Card Adapter for Desktop PC's, pp. 1-7.

Adaptec, "SlimSCSI 1460" For Fast, Easy Connections to All SCSI Devices 8 pages.

Edge: Work-Group Computing Report, Nov. 21, 1994 "PCMCIA: Adaptec targets mobile computing market with two new host adapters that relieve problem of system-tosystem and peripheral connectivity" 2 pages.

Axonix, "Expanding Your Portable World", *Axonix advertisement*, (1994),pp. 1-2.

"Draft Standard for a High Performance Serial Bus (Amendment)", U.S. Appl. No. 11/183,298, Author—IEEE Microprocessor and Microcomputer Standards Committee,(Feb. 11, 2000),p. 1394a.

"Non Final Office Action", U.S. Appl. No. 11/183,298, (Feb. 13, 2009),12 pages.

"Non Final Office Action", U.S. Appl. No. 11/183,298, (Jun. 18, 2008),11 pages.

"Non Final Office Action", U.S. Appl. No. 11/183,298, (Oct. 30, 2007),35 pages.

"Final Office Action", U.S. Appl. No. 11/183,298, (Sep. 15, 2006),35 Pages.

"Non Final Office Action", U.S. Appl. No. 11/183,298, (Feb. 15, 2006),49 Pages.

"Non Final Office Action", U.S. Appl. No. 11/513,806, (Mar. 12, 2007),10 pages.

"Final Office Action", U.S. Appl. No. 11/513,806, (Sep. 27, 2007),8 pages.

"Advisory Action", U.S. Appl. No. 11/513,806, PTOL 303,(Apr. 10, 2008),5 pages.

"Non Final Office Action", U.S. Appl. No. 11/513,806, (Oct. 2, 2008),22 pages.

"Non Final Office Action", U.S. Appl. No. 11/300,131, (Dec. 15, 2006), 13 pages.

"Final Office Action", U.S. Appl. No. 11/300,131, (Aug. 20, 2007),9 pages.

"Non Final Office Action", U.S. Appl. No. 11/300,131, (Mar. 27, 2008), 12 pages.

"Non Final Office Action", U.S. Appl. No. 11/300,131, (Nov. 12, 2008),20 pages.

"Non Final Office Action", U.S. Appl. No. 10/766,660, (May 15, 2006), 17 pages.

"Final Office Action", U.S. Appl. No. 10/766,660, (Dec. 4, 2006), 17 pages.

"Non Final Office Action", U.S. Appl. No. 09/130,057, (Jul. 21, 1999),27 pages.

"Non Final Office Action", U.S. Appl. No. 10/782,082, (Jun. 9, 2006), 17 pages.

"Final Office Action", U.S. Appl. No. 10/782,082, (Mar. 6, 2007), 15 Pages.

"Advisory Action", U.S. Appl. No. 10/782,082, (Jul. 9, 2007),4 pages.

"Non Final Office Action", U.S. Appl. No. 10/782,082, (Nov. 9, 2007), 12 Pages.

"Final Office Action", U.S. Appl. No. 10/782,082, (Aug. 11, 2008),26 pages.

"Final Office Action", U.S. Appl. No. 10/782,082, (Feb. 2, 2009),27 pages.

"Non Final Office Action", U.S. Appl. No. 09/559,677, (Jun. 26, 2002),4 pages.

"Non Final Office Action", U.S. Appl. No. 09/559,677, (Dec. 12, 2002),5 pages.

"Notice of Allowance", U.S. Appl. No. 09/559,677, (Mar. 20, 2003),3 pages.

"PCI to PCI Bridge Specifications", *Author—PCI Special Interest Group Revision 1.0*, (Apr. 5, 1994),26 pages.

"PCI-to-PCI Bridge Architecture Specification", *PCI Local Bus; XP-002382184; Revision 1.1*, (Dec. 18, 1998), 148 pages.

"Non Final Office Action", U.S. Appl. No. 09/819,053, (Apr. 22, 2004), 12 pages.

"Final Office Action", U.S. Appl. No. 09/819,053, (Jul. 12, 2005),46 pages.

"Non Final Office Action", U.S. Appl. No. 09/819,053, (Mar. 2, 2006), 14 pages.

"Notice of Allowance", U.S. Appl. No. 09/819,053, (Jun. 15, 2007), 13 pages.

"Patent Abstracts of Japan vol. 2003, No. 6, Jun. 3, 2003 & JP 2003 050661", *Casio Computer Co., Ltd.*, (Feb. 21, 2003), 1 page.

"International Search Report", PCT/US2005/006089, (Jun. 12, 2005),4 pages.

Fulp, C. D., et al., "A Wireless Handheld System for Interactive Multimedia-Enhanced Instruction", *FIE 2002. 32nd Annual Frontiers In Education Conference*, Boston, MA. Nov. 6-9, 2002, *Frontiers In Education Conference*, New York, NY: *IEEE*, US, vol. 1 of 3, Conf. 32, (Nov. 6, 2002),4 pages.

"Notice of Allowance", U.S. Appl. No. 09/819,057, (Mar. 14, 2003),4 pages.

"Non Final Office Action", U.S. Appl. No. 09/819,057, (Nov. 26, 2002),7 pages.
"Notice of Allowance", U.S. Appl. No. 09/819,054, (Dec. 2, 2003),8 pages.
"Non Final Office Action", U.S. Appl. No. 09/819,054, (Jan. 28, 2003), 11 pages.
"Notice of Allowance", U.S. Appl. No. 09/130,058, (Feb. 25, 2000),4 pages.
"Non Final Office Action", U.S. Appl. No. 09/130,058, (Jul. 21, 1999),32 pages.
"Non Final Office Action", U.S. Appl. No. 11/513,976, (Oct. 27, 2006), 10 pages.
"Notice of Allowance", U.S. Appl. No. 11/513,976, (Jan. 16, 2008),7 pages.
"Foreign Office Action", Application Serial No. 2,445,711, (Mar. 18, 2009),2 pages.
"Notice of Allowance/Base Issue Fee", U.S. Appl. No. 11/300,131, (Jun. 18, 2009), 4 pages.
"Advisory Action", U.S. Appl. No. 10/782,082, (Apr. 7, 2009),3 pages.
"International Search Report", EP01925078, (Oct. 30, 2001),2 Pages.
"International Search Report", PCT/US2001/12678, (Oct. 30, 2001),2 pages.
"European Search Report", EP07000788, (Oct. 1, 2008),1 Page.
"International Search Report", PCT/US2001/12666, (Nov. 15, 2001),2 pages.
"Allowed Claims", U.S. Appl. No. 11/300,131, (Jun. 18, 2009),7 pages.
Gillett, Richard B., "Memory Channel Network for PCI", *IEEE 1996*, (1996),7 pages.
Ekiz, H. et al., "Performance Analysis of a CAN/CAN Bridge" *IEEE 1996*, describes a Bridge Process Model with Bridge Port A and Bridge Port B. The Bridge Port A connects to a LAN 1 Data Lin. Next, the Bridge Port B connects to a LAN 2 Data Link (see fig. 2).,(1996),8 pages.
Marsden, Philip "Interworking IEEE 802/FDDI LAN's Via the ISDN Frame Relay Bearer Service", *Proceedings of the IEEE*, vol. 79, No. 2, Feb. 1991, describes ISDN MAC Bridge/Routers. The Bridge/Router connects directly to each other via 2Mbit/s ISDN interface (see fig. 6), (Feb. 1991),p. 223-229.
Gillett, Richard B., et al., "Using the Memory Channel Network", *IEEE 1997*, (1997),p. 19-25.
Annamalai, Kay "Multi-ported PCI-to-PCI Bridge Chip", *IEEE 1997*, (1997),p. 426-433.
Mora, F et al., "Design of a high performance PCI interface for an SCI network", *Computing & Control Engineering Journal*, Dec. 1998., p. 275-282.

Skaali, B et al., "A Prototype DAQ System for the ALICE Experiment Based on SCI", *IEEE Transactions on Nuclear Science*, vol. 45, Aug. 1998, 1917-1922.
Mora, F et al., "Electronic Design of a High Performance Interface to the SCI Network", *IEEE 1998*, (1998),p. 535-538.
Harper, Stephen "Update on PCMCIA Standard Activities: Cardbus and Beyond", *PCMIA 1995*, (1995),p. 136-144.
Bui, et al., "60x Bus-to-PCI Bridge", *IBM TDB* May 1995, p. 401-402.
Anon, "Remote Memory Access Interface Between Two Personal Computers", *IBM Technical Disclosure Bulletin* v 28 n. 9 Feb. 1986, 4110-4113.
Karl, Wolfgang et al., "SCI monitoring hardware and software: supporting performance evaluation and debugging", Book Title: SCI: scalable coherent interface. Architecture and software for high-performance compute clusters,(1999),p. 417-432.
Poor, Alfred "The Expansion Bus.(ISA, PCI, and AGP)(Technology Information)", *PC Magazine*, 194(1) Jan. 19, 1999, 5 pages.
Surkan, Michael "NetFrame takes lead in reliability: ClusterSystem's hot-swappable PCI a", *PC Week*, v14, n34, p60(1) Aug. 11, 1997, NetFRAME Systems' ClusterSystem 9008 Pentium Pro-based system) (Hardware Review)(Evaluation),(Aug. 11, 1997),4 pages.
Balatsos, A et al., "A bridge for a multiprocessor graphics system", *Proceedings of the 2002 IEEE Canadian Conference on Electrical and Computer Engineering*,(2002),P. 646-650.
"MC68HC11A8—HCMOS Single-Chip Microcontroller", *Motorola, Inc. 1996*, (1996),158 pages.
"PCI-to-PCI Bridge Architecture Specification", *Chapter 5—Buffer Management*, Tables 5-1,(Dec. 18, 1998), pp. 69-92.
"Foreign Office Action", Application Serial No. 2001-560830, (Mar. 19, 2009), 3 pages.
"Foreign Office Action", Application Serial No. 2001-560831, (Mar. 19, 2009), 3 pages.
"Foreign Office Action", Application Serial No. 2006-203273, (Jul. 21, 2009), 10 pages.
"Foreign Office Action", Application Serial No. 2006-203293, (Jun. 26, 2009), 9 pages.
"Notice of Allowance", U.S. Appl. No. 11/300,131, (Oct. 22, 2009), 4 pages.
"Notice of Allowance", U.S. Appl. No. 11/300,131, (Dec. 4, 2009),4 pages.
"Notice of Allowance and Examiner's Amendment", U.S. Appl. No. 11/183,298, (Feb. 25, 2010), 9 pages.

* cited by examiner

Split-Bridge

Fig. 3

MODULAR COMPUTER SYSTEM

CROSS REFERENCE TO RELATED APPLICATIONS

This application claims the benefit of U.S. Provisional Application No. 60/198,317, filed en Apr. 19, 2000, which is hereby incorporated by reference herein. This application is also a continuation-in-part application of U.S. application Ser. No. 09/130,057, filed Aug. 6, 1998, now U.S. Pat. No. 6,088,752, which is hereby incorporated by reference herein. This application is also a continuation-in-part application of U.S. Application Ser. No. 09/130,058, filed Aug. 6, 1998, now U.S. Pat. No. 6,070,214, which is hereby incorporated by reference herein. This application is also related to U.S. Patent Application Ser. No. 08/679,131, now U.S. Pat. No. 5,941,965, which is hereby incorporated by reference herein.

FIELD OF THE INVENTION

The present invention is generally related to computers and data processing systems, and more particularly to computer systems having at least one host processor and connectable to a plurality of peripherals, expansion devices, and/or other computers, including notebook and other portable and hand-held computers, storage devices, displays, USB, IEEE 1394, audio, keyboards, mice, and so forth.

BACKGROUND OF THE INVENTION

Computer systems today are powerful, but are rendered limited in their ability to be divided into modular components due to a variety of technical limitations of today's PCI bus technology. And in their ability to adapt to changing computing environments. The PCI bus is pervasive in the industry, but as a parallel data bus is not easily extended over any distance or bridged to other remote PCI based devices due to loading and physical constraints, most notably the inability to extend the PCI bus more than a few inches. Full bridges are known, such as used in traditional laptop computer/docking stations. However, separating the laptop computer from the docking station a significant distance has not been possible. Moreover, the processing power of computer systems has been resident within the traditional computer used by the user because the microprocessor traditionally is directly connected to and resident on the PCI motherboard. Thus, upgrading processing power usually meant significant costs and/or replacing the computer or computer system.

PCI

The PCI bus is primarily a wide multiplexed address and data bus that provides support for everything from a single data word for every address to very long bursts of data words for a single address, with the implication being that burst data is intended for sequential addresses. Clearly the highest performance of the PCI bus comes from the bursts of data, however most PCI devices require reasonable performance for even the smallest single data word operations. Many PCI devices utilize only the single data mode for their transfers. In addition, starting with the implementation of the PCI 2.1 version of the specification, there has been at least pseudo isochronous behavior demanded from the bus placing limits on an individual device's utilization of the bus, thus virtually guaranteeing every device gets a dedicated segment of time on a very regular interval and within a relatively short time period. The fundamental reason behind such operation of the PCI bus is to enable such things as real time audio and video data streams to be mixed with other operations on the bus without introducing major conflicts or interruption of data output. Imagine spoken words being broken into small unconnected pieces and you get the picture. Prior to PCI 2.1 these artifacts could and did occur because devices could get on the bus and hold it for indefinite periods of time. Before modification of the spec for version 2.1, there really was no way to guarantee performance of devices on the bus, or to guarantee time slot intervals when devices would get on the bus. Purists may argue that PCI is still theoretically not an isochronous bus, but as in most things in PC engineering, it is close enough.

Traditional High Speed Serial

Typical high speed serial bus operation on the other hand allows the possibility of all sizes of data transfers across the bus like PCI, but it certainly favors the very long bursts of data unlike PCI. The typical operation of a serial bus includes an extensive header of information for every data transaction on the bus much like Ethernet, which requires on the order of 68 bytes of header of information for every data transaction regardless of length. In other words, every data transaction on Ethernet would have to include 68 bytes of data along with the header information just to approach 50% utilization of the bus. As it turns out Ethernet also requires some guaranteed dead time between operations to "mostly" prevent collisions from other Ethernet devices on the widely disperse bus, and that dead time further reduces the average performance.

The typical protocol for a serial bus is much the same as Ethernet with often much longer header information. Virtually all existing serial bus protocol implementations are very general and every block of data comes with everything needed to completely identify it. FiberChannel (FC) has such a robust protocol that virtually all other serial protocols can be transmitted across FC completely embedded within the FC protocol, sort of like including the complete family history along with object size, physical location within the room, room measurements, room number, street address, city, zip code, country, planet, galaxy, universe, . . . etc. and of course all the same information about the destination location as well, even if all you want to do is move the object to the other side of the same room. Small transfers across many of these protocols, while possible, are extremely expensive from a bandwidth point of view and impractical in a bus applications where small transfers are common and would be disproportionally burdened with more high overhead than actual data transfer. Of course the possibility of isochronous operation on the more general serial bus is not very reasonable.

Recreating High Speed Serial for PCI

In creating the proprietary Split-Bridge™ technology, Mobility electronics of Phoenix Ariz., the present applicant, actually had to go back to the drawing board and design a far simpler serial protocol to allow a marriage to the PCI bus, because none of the existing implementations could coexist without substantial loss of performance. For a detailed discussion of Applicant's proprietary Split-Bridge™ technology, cross reference is made to Applicant's co-pending commonly assigned patent applications identified as Ser. No. 09/130,057 and Ser. No. 09/130,058 both filed Aug. 6, 1998, the teachings of each incorporated herein by reference. The Split-Bridge™ technology approach is essentially custom fit for PCI and very extensible to all the other peripheral bus protocols under discussion like PCIx, and LDT™ set forth by AMD Corporation. LDT requires a clock link in addition to its data links, and is intended primarily as a motherboard application, wherein Split-Bridge™ technology is primarily intended to enable remote bus recreation. As the speeds of motherboard buses continue to grow faster, Split-Bridge™ can be readily adapted to support these by increasing the serial bus speed and adding multiple pipes. Split-Bridge™ technology fundamentals are a natural for extending anything that exists within a computer. It basically uses a single-byte of overhead for 32 bits of data and address—actually less when you consider that byte enables, which are not really "overhead", are included as well.

Armed with the far simpler protocol, all of the attributes of the PCI bus are preserved and made transparent across a high speed serial link at much higher effective bandwidth than any existing serial protocol. The net result is the liberation of a widely used general purpose bus, and the new found ability to separate what were previously considered fundamental inseparable parts of a computer into separate locations. When the most technical reviewers grasp the magnitude of the invention, then the wheels start to turn and the discussions that follow open up a new wealth of opportunities. It now becomes reasonable to explore some of the old fundamentals, like peer-to-peer communication between computers that has been part of the basic PCI specification from the beginning, but never really feasible because of the physical limits of the bus prior to Split-Bridge™ technology. The simplified single-byte overhead also enables very efficient high speed communication between two computers and could easily be extended beyond PCI.

The proprietary Split-Bridge™ technology is clearly not "just another high speed link" and distinguishing features that make it different represent novel approaches to solving some long troublesome system architecture issues.

First of all is the splitting of a PCI bridge into two separate and distinct pieces. Conceptually, a PCI bridge was never intended to be resident in two separate modules or chips and no mechanism existed to allow the sharing of setup information across two separate and distinct devices. A PCI bridge requires a number of programmable registers that supply information to both ports of a typical device. For the purpose of the following discussion, the two ports are defined into a north and south segment of the complete bridge.

The north segment is typically the configuration port of choice and the south side merely takes the information from the registers on the north side and operates accordingly. The problem exists when the north and south portions are physically and spatially separated and none of the register information is available to the south side because all the registers are in the north chip. A typical system solution conceived by the applicant prior to the invention of Split-Bridge™ technology would have been to merely create a separate set of registers in the south chip for configuration of that port. However, merely creating a separate set of registers in the south port would still leave the set up of those registers to the initialization code of the operating system and hence would have required a change to the system software.

Split-Bridge™ technology, on the other hand, chose to make the physical splitting of the bridge into two separate and spaced devices "transparent" to the system software (in other words, no knowledge to the system software that two devices were in fact behaving as one bridge chip). In order to make the operations transparent, all accesses to the configuration space were encoded, serialized, and "echoed" across the serial link to a second set of relevant registers in the south side. Such transparent echo between halves of a PCI bridge or any other bus bridge is an innovation that significantly enhances the operation of the technology.

Secondly, the actual protocol in the Split-Bridge™ technology is quite unique and different from the typical state of the art for serial bus operations. Typically transfers are "packetized" into block transfers of variable length. The problem as it relates to PCI is that the complete length of a given transfer must be known before a transfer can start so the proper packet header may be sent.

Earlier attempts to accomplish anything similar to Split-Bridge™ technology failed because the PCI bus does not inherently know from one transaction to the next when, or if, a transfer will end or how long a block or burst of information will take. In essence the protocol for the parallel PCI bus (and all other parallel, and or real time busses for that matter) is incompatible with existing protocols for serial buses.

An innovative solution to the problem was to invent a protocol for the serial bus that more or less mimics the protocol on the PCI. With such an invention it is now possible to substantially improve the performance and real time operation here to for not possible with any existing serial bus protocol.

The 8 bit to 10 bit encoding of the data on the bus is not new, but follows existing published works. However, the direct sending of 32 bits of information along with the 4 bits of control or byte enables, along with an additional 4 bits of extension represents a 40 bit for every 36 bits of existing PCI data, address, and control or a flat 10% overhead regardless of the transfer size or duration, and this approach is new and revolutionary. Extending the 4 bit extension to 12 or more bits and including other functionality such as error correction or retransmit functionality is also within the scope of the Split-Bridge™ technology.

New Applications of the Split-Bridge™ Technology

Basic Split-Bridge™ technology was created for the purpose of allowing a low cost, high speed serial data communications between a parallel system bus and remote devices. By taking advantage of the standard and pervasive nature of the PCI bus in many other applications in computing, dramatic improvements in the price performance for other machines is realized. The present invention comprises a revolutionary application rendered possible due to the attributes of applicant's proprietary Split-Bridge™ technology.

SUMMARY OF THE INVENTION

The present invention achieves technical advantages as a modular computer system having a universal connectivity station adapted to connect and route data via serial data links to a plurality of devices, these serial links and interfaces at each end thereof employing proprietary Split-Bridge™ technology disclosed and claimed in co-pending and commonly assigned patent applications identified as Ser. No. 09/130,057 and Ser. No. 09/130,058, the teachings of which are incorporated herein by reference.

The present invention derives technical advantages as a modular computer system by separating into two or more spatially separate and distinct pieces, a computer core and a universal connectivity station (UCS). The core is the performance module of the modular computer system and may include some or all of the central processing unit (CPU), memory, AGP Graphics, and System Bus Chip adapted to communicably couple these three together or in combination with other items. The UCS communicably couples the processor module via high speed serial links based on the proprietary Split-Bridge™ technology of Mobility Electronics of Phoenix Ariz., the applicant of the present invention, to other computers or to other individual modules such as storage modules including hard disk drives, a user interface module consisting of a keyboard, mouse, monitor and printer, as well as a LAN Module such as any Internet connection or another UCS, another UCS, audiovisual device, LAN storage just to name a few. In addition, the UCS is adapted to couple via a Split-Bridge™ technology serial link with a portable or handheld computer or device remotely located from the UCS but still functionally coupled to the modular computer system via the UCS. The UCS and associated Split-Bridge™ technology serial links are all transparent to the modules which can have parallel data busses including those based on PCI or Cardbus architectures.

The modular computer system of the present invention including the UCS is a novel approach to computer architecture and upgrade ability. Advantageously, the separate performance module may be selectively upgraded or modified as desired and as technology increases the performance of key components including microprocessor speed, standards, and architectures without necessitating the replacement or modification of the rest of the computer system. The UCS allows the performance module to be upgraded while the rest of the system devices coupled thereto do not need to be modified. Upgrading to single or multiple processors in the performance module or modules is readily possible. Whole organizations can standardize to a single UCS regardless of the type of performance or portability required by the users, thus addressing for the first time the means of systems level support. In security sensitivity environments, it is possible to separate the "stored media" or computer central processor, or any other component of the system and connectivity from the operators, and still maintain the speed element so important in today's businesses.

DETAILED DESCRIPTION OF THE PREFERRED EMBODIMENT

Figure 1:
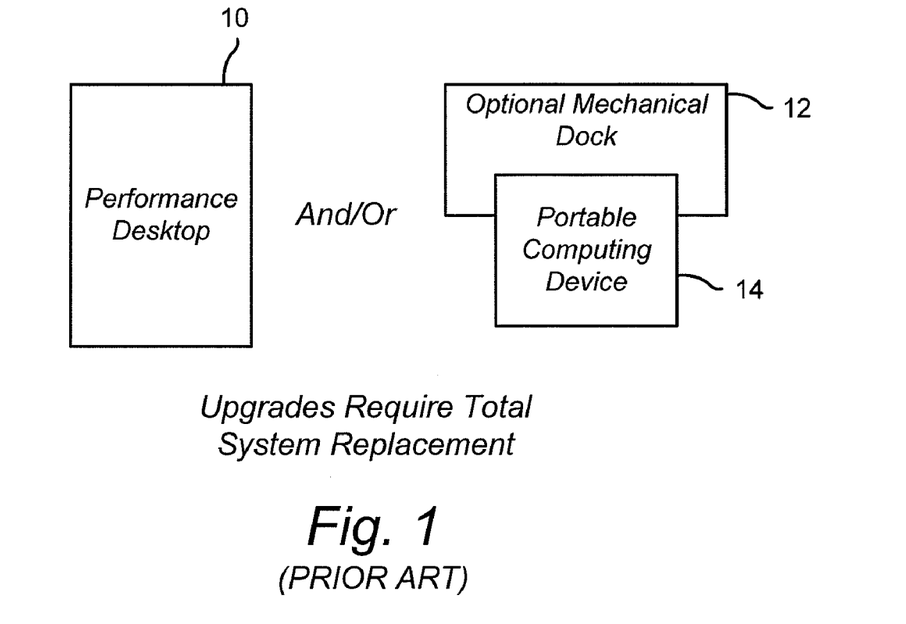
FIG. 1 illustrates prior art computer systems depicted as a traditional performance desk top computer shown at 10, and a portable computing device 12, such as a notebook or laptop computer, mechanically coupled to mechanical docking station 14.
Figure 2:
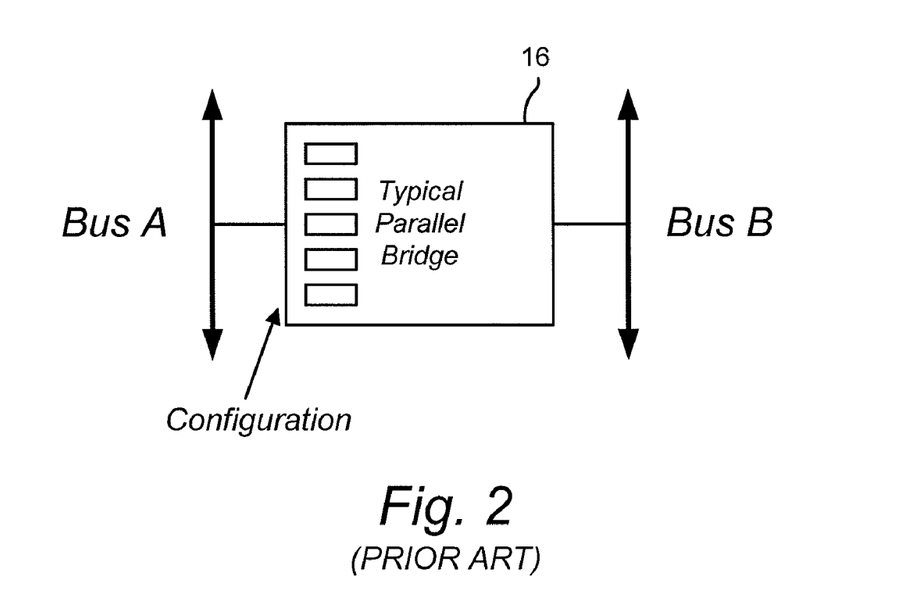
FIG. 2 is a block diagram of a prior art bridge 16 used to couple two system computing buses, such as used between the portable computing device 12 and the mechanical docking station 14 shown in FIG. 1.
Figure 3:
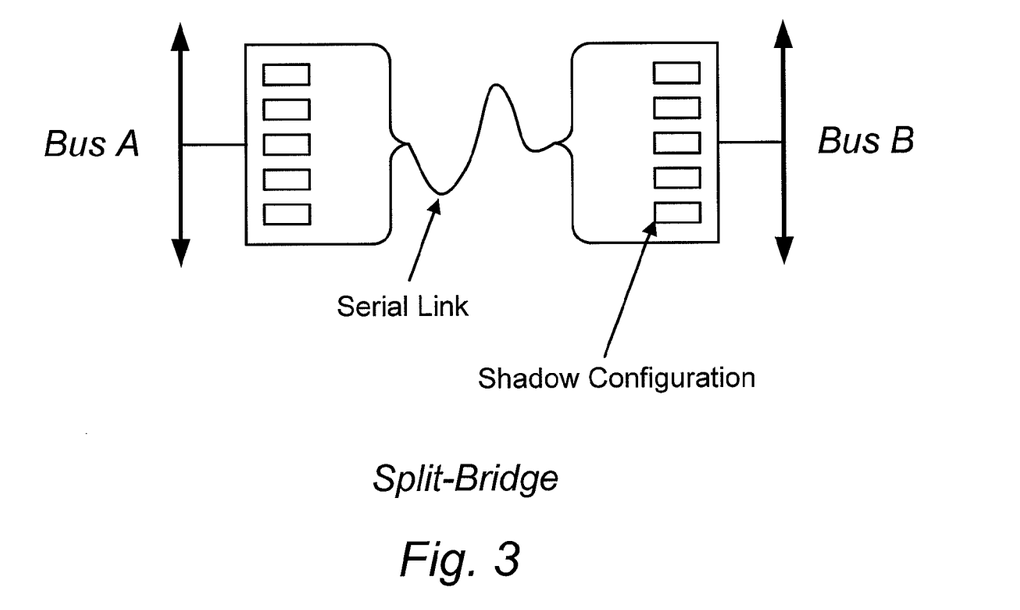
FIG. 3 illustrates the proprietary Split-Bridge™ technology serial communication technology of the applicant enabling high speed serial communications within the modular computer system of the present invention.

Referring to FIG. 3, there is depicted the proprietary Split-Bridge™ technology serial communications technology of the present applicant, discussed in great detail in commonly assigned U.S. patent application Ser. No. 09/130,057 filed Aug. 6, 1998, and Ser. No. 09/130,058 also filed Aug. 6, 1998 the teachings of which are incorporated herein by reference.

Applicant Split-Bridge™ technology revolutionizes the status quo for computer systems. The Split-Bridge™ technology does not require the need for custom hardware or custom software to achieve full performance serial communication between devices, including devices having parallel data buses including the PCI bus. In fact, for each device in a modular computer system, the Split-Bridge™ technology appears just like a standard PCI bridge, and all software operating systems and device drivers already take such standard devices into consideration. By utilizing standard buses within each device operating within the modular computer system, each device does not require any additional support from the Operating System (OS) software. The modular computing system has simple elegance, allowing the PCI bus which is so pervasive in the computer industry, that possible applications of the initial PCI form of Split-Bridge™ technology are all most limitless.

Originally implemented in PCI, there is nothing fundamental that ties the Split-Bridge™ technology to PCI, and thus, the Split-Bridge™ technology can migrate as bus architectures grow and migrate. The 64 bit PCI is compatible with the Split-Bridge™ technology, as is future PCIx and/or LDT or other bus technologies that are currently under consideration in the industry and which are straight forward transitions of the Split-Bridge™ technology. Implementations with other protocols or other possible and natural evolutions of the Split-Bridge™ technology, including digital video (DV) technology that can be streamed over the high-speed serial link.

Figure 4:
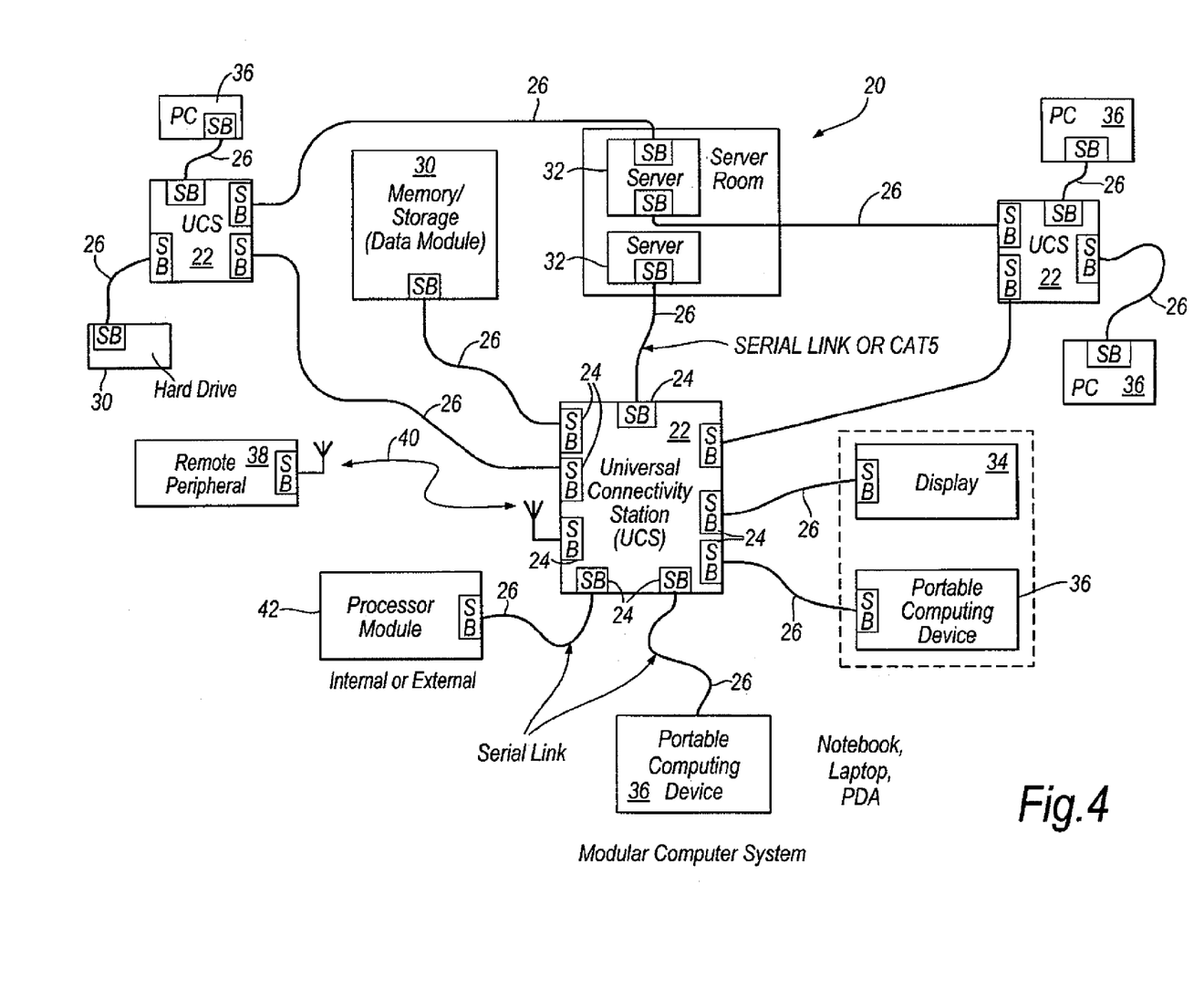
FIG. 4 is a block diagram of the modular computer system of the present invention utilizing a universal connectivity station (UCS) communicably coupled to a plurality of devices via serial links, such as the Split-Bridge™ technology serial links employed using fixed wire, optical, or wireless communication links.

Referring to FIG. 4, there is depicted at 20 a modular computer system according to one illustrative embodiment of the present invention. The modular computer system 20 is based around one or more universal connectivity stations generally shown at 22 each having a plurality of interface ports 24 which are preferably based on the proprietary Split-Bridge™ technology of the present applicant, Mobility Electronics of Phoenix Ariz. Each UCS 22 provides input/output, or I/O, capability of the computer or computer system 20, as well as modular expansion capability and features. UCS 22 includes all possible variations and combinations of port replication and connectivity, including but not limited to the following ports: P/S2, mouse and keyboard, serial, parallel, audio, USB, IEEE 1394, or firewire, SCSI, and the like. Each UCS 22 also includes the ability to expand the capability or features of the computer system 20 by adding any type of drive bays, including EIDE, USB, and 1394 CD Roms, DVD's, hard drives, tape back up's, ZIP Drives®, Jazz® drives, and the like.

A plurality of interconnecting and interactive devices are communicably coupled to each UCS 22 via respective high speed serial links generally shown at 26 based on the proprietary Split-Bridge™ technology. In the hardwire embodiment, the serial links 26 comprise of a pair of simplex links forms a duplex link interconnecting each end of the Split-Bridge™ technology interfaces as shown. The serial links 26 may also employ optical fiber and optical transceivers if desired. The various modules making up modular computer system 20 may include, and a plurality of, but are not limited to, a memory/storage device 30, servers 32 having one or multiple processors and possibly serving other UCS's 22, as shown, and modular computer systems, remote users and so forth, a display 34, a portable computing device 36, such as a notebook computer, a laptop computer, a portable digital assistant (PDA), and a remote wireless peripheral 38 which may interconnected via a wireless link shown at 40 and implementing the proprietary Split-Bridge™ technology. Examples of remote wireless terminals 38 may include 3$^{rd}$ generation (3G) devices now being developed and employed, including wireless personal devices having capabilities for voice, data, video and other forms of information which can be unidirectionally or bidirectionally streamed between the remote peripheral 38 and UCS 22. An appropriate antenna resides at each of the remote peripheral 38 and UCS 22 which are interconnected to respective transceivers communicably coupled to the respective ends of the Split-Bridge™ technology interfaces.

Moreover, multiple UCSs 22 can be integrated to communicate with each other via serially links 26, each UCS 22 locally serving multiple modules. Multiple computers can be connected to a common UCS, or to multiple UCS's. For example, a computer or server room can have rack's of computer processors or servers, each separately connected over a system of up to hundred's of feet, to one or many UCS's located throughout an office or other environment. This allows the desktop to have just a terminal or whatever capabilities the IT manager desires, enhancing security and control.

System 20 also provides the ability to simultaneously connect multiple computers 36 and allows full peer-to-peer communications, allowing the processor module (CPU) 42 to communicate with the portable device computer 36 or to the computer room computers 32, allowing all of these computers to share information and processing capability. This also allows certain of the computers, such as the portable computer 36, to upgrade its processing capability when it is connected to the UCS 22 with other higher capability computers.

Still referring to FIG. 4, the modular computer system 20 of the present invention further comprises a processor module 42, which may be remotely positioned from the UCS 22, but for purposes of inclusion, could internally reside with the UCS 22. The processor module 42, from a performance point of view, is the heart and sole of the modular computer system 20 and can be made up of one or more core parts including: the CPU, memory, APG Graphics, and a system bus interface to connect the other 3 together. The processor module 42 operates in conjunction with memory such as a hard disk drive, which can reside within the processor module 42, or be remotely located as shown at 30 if desired. The APG Graphics could be located separately within the system and interconnected via a serial link 26, or even located within UCS 22 if desired.

Advantageously, the processor module 42 which may comprise of a high speed microprocessor or microprocessors, digital signal processors (DSP's), and can be upgraded or interchanged from the systems 20 without effecting the other devices or operation of the system, thereby permitting increased performance at a very low cost. Computers today typically require the replacement or upgrading of other devices when the performance portion of the computer system is replaced. The modular computer system 20 of the present invention revolutionizes the computer architectures available by separating out the processor module 42 from the rest of the computer system 20. Each of the modules 30, 32, 34, 36, and 38 all have functional access and use of the processor module 42 via the UCS 22 over the respective serial links 26 and 40, and from a performance point of view, appear to each of these devices to be hardwired to the processor module 42. That is, the Split-Bridge™ technology links interconnecting each of the devices via the UCS 22 to the processor module 42 is transparent to each device, thus requiring no change to the OS of each device, the format of data transfer therebetween, or any other changes. This is rendered possible by the revolutionary Split-Bridge™ technology.

Another advantage of computer system 20 is that the data module 30 may be customized, portable, and used only by one user. This allows the user to take the portable module 30 with them from location to location, system 20 to system 20. The data module 30 can store each user's unique information, and can be accessed and used on any processor module 42 and UCS 22.

As discussed in considerable detail in the cross-referenced and commonly assigned patent applications, the Split-Bridge™ technology provides that information from the parallel buses of each device be first loaded into first-in first-out (FIFO) registers before being serialized into frames for transmission over the high speed serial link. Received frames are deserialized and loaded into FIFO registers at the other end thereof, such as UCS 22, for being placed onto the destination bus of the opposing device. Interrupts, error signals and status signals are sent along the serial link. Briefly, the proprietary Split-Bridge™ technology takes address and data from a bus, one transaction at a time, together with 4 bits that act either as control or byte enable signals. Two or more additional bits may be added to tag each transaction as either an addressing cycle, an acknowledging of a non-posted write, a data burst, end of data burst or cycle. If these transactions are posted writes they can be rapidly stored in a FIFO register before being encoded into a number of frames that are sent serially over the link. When pre-fetched reads are allowed, the FIFO register can store pre-fetched data in case the initiator requests it. For single cycle writes or other transactions that must await a response, the bridge can immediately signal the initiator to retry the request, even before the request is passed to the target.

In the preferred embodiment of the modular computer system of the present invention, one or more of the busses in the plurality of devices, as well as in the UCS 22, employ the PCI or PCMCIA standard, although it is contemplated that other bus standards can be used as well. The preferred Split-Bridges™ technology operates with a plurality of configuration registers that is loaded with information specified under the PCI standard. The Split-Bridges™ technology transfers information between busses depending on whether the pending address falls within a range embraced by the configuration registers. This scheme works with devices on the other side of the Split-Bridge™ technology, which can be given unique base addresses to avoid addressing conflicts.

As disclosed in great detail in the co-pending and cross-referenced commonly assigned patent applications, the Split-Bridges™ technology may be formed as two separate application-specific integrated circuits (ASICs) joined by a duplex link formed as a pair of simplex links. Preferably, these two integrated ASICs have the same structure, but can act in two different modes in response to a control signal applied to one of its pins. Working with hierarchical busses (primary and secondary busses) these integrated circuits are placed in a mode appropriate for its associated bus. The ASIC associated with the secondary bus preferably has an arbitrator that can grant masters control of the secondary bus. The ASIC can also supply a number of ports to support other devices such as a USB and generic configurable I/O ports, as well as parallel and serial ports.

The UCS preferably comprises a PCI bus having a plurality of PC card slots located with the UCS housing. Each PC card slot is provided with a Split-Bridge™ technology interface, and preferably one of the ASICs assembled with a standardized serial connector comprising at least 4 pins, as depicted in the cross referenced commonly assigned patent applications, the teachings of which are incorporated herein by reference.

The modular computer system 20 of the present invention derives technical advantages in that the UCS station 22 with its associated interface cards and parallel data bus interconnecting each interface card, is truly functionally transparent to each of the interconnected modules including the memory storage device 30, the server 32, the display 34, the portable computing device 36, the remote wireless peripheral 38, and the processor module 42. This integration of devices into a modular computer system has truly enormous potential and uses depending on the desired needs and requirements of one's computing system. However, the physical location and proximity of each of the devices forming the modular computer system are no longer strictly limited due to the high speed serial interconnection links of the proprietary Split-Bridge™ technology. Each of the devices can be remotely located, or located in proximity to one another as desired. For instance, the display 34 and portable computing device 36 may be resident within one's office, with the UCS 22 in another room, and with the memory storage device 30, server 32, and performance module 42 remotely located in yet still another room or location. Moreover, a plurality of portable computing devices 36 can all be remotely located from UCS 22, and from each other, allowing networking to modular system 20 either through wireless serial links as depicted at 26, or wirelessly as depicted at 40.

The proprietary Split-Bridge™ technology presently allows for extended communication distances of 5 meters, but through advancement in technology can continue to be extended. For instance, using optical communication links in place of copper wire simplex links, along with suitable optical transceivers, can yield links that are exceptionally long. Using wireless technology, as depicted at 40, allows a remote peripheral 38 to be located perhaps anywhere in the world, such as by implementing repeaters incorporating the proprietary Split-Bridge™ technology high speed serial communication technology. Additional techniques can be used by slowing the transfer rate, and increasing the number of pipes, to achieve link distances of hundreds of feet, and allowing the use of CAT5 cable.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. A spatially separated computer system, comprising:
    a first connectivity station having a first interface adapted to asynchronously, serially exchange parallel bus data thereacross;
    a computing module disposed in the first connectivity station including a processing unit and a system bus coupled to the first interface;
    a first module remotely positioned relative to the first connectivity station and having an interface coupled to the first connectivity station first interface via a serial communications link, wherein the first module is adapted to cooperate with the processing unit; and
    wherein the first module and the first connectivity station asynchronously, serially transfer data therebetween via the serial communications link and collectively operate as a single computer.

2. The computer system as specified in claim 1 wherein the first connectivity station first interface comprises a bridge.

3. The computer system as specified in claim 2 wherein the system bus is coupled to the first interface via a serial link.

4. The computer system as specified in claim 3 wherein said serial link includes multiple channels.

5. The computer system as specified in claim 1 wherein the first module is selected from a group comprising of: memory, graphics, a disk drive, a keyboard, a mouse, a monitor, a printer, and an Internet connection.

6. The computer system as specified in claim 1 wherein the first module is separated from the first connectivity station by a distance of at least a meter.

7. The computer system as specified in claim 6 wherein the first module is separated from the first connectivity station by a distance of at least several meters.

8. The computer system as specified in claim 1 wherein the first connectivity station is adapted to serially transfer data with the first module without requiring handshaking.

9. The computer system as specified in claim 1 wherein the first connectivity station comprises a second interface, further comprising a second module remotely positioned from the first connectivity station and having an interface coupled to the first connectivity station second interface via a serial link and adapted to serially transfer data with the computing module or the first module.

10. The computer system as specified in claim 1 wherein the first module includes a processing unit.

11. The computer system as specified in claim 9 wherein the second module comprises a processing unit.

12. The computer system as specified in claim 1 wherein the first module is based on a parallel data bus architecture.

13. The computer system as specified in claim 12 wherein the parallel data bus is a PCI data bus.

14. The computer system as specified in claim 12 wherein the data bus is a Cardbus data bus.

15. The computer system as specified in claim 12 wherein the parallel data bus is a PCIX data bus.

16. The computer system as specified in claim 1 further comprising a third module having an interface coupled to the first module.

17. The computer system as specified in claim 16 wherein the third module is based on a parallel data bus architecture.

18. The computer system as specified in claim 17 wherein the parallel data bus is a PCI data bus.

19. The computer system as specified in claim 17 wherein the parallel data bus is a Cardbus data bus.

20. The computer system as specified in claim 17 wherein the parallel data bus is a PCIX data bus.

21. A computer system, comprising:
    a connectivity station having a plurality of interfaces including a first and a second interface, each said interface being adapted to asynchronously, serially exchange parallel bus information;
    a first module having an interface coupled to the connectivity station first interface via a serial link; and
    a computing module including a processor and a system bus coupled to a computing module interface, the computing module interface coupled to the connectivity station second interface via a serial communications link and adapted to asynchronously, serially exchange said parallel bus information.

22. The computer system as specified in claim 21 wherein said computing module interface comprises a bridge.

23. The computer system as specified in claim 22 wherein the first module is based on a parallel data bus architecture.

24. The computer system as specified in claim 23 wherein the parallel data bus is a PCI data bus.

25. The computer system as specified in claim 23 wherein the parallel data bus is a Cardbus data bus.

26. The computer system as specified in claim 23 wherein the parallel data bus is a PCIX data bus.

27. The computer system as specified in claim 21 wherein the computing module comprises memory.

28. The computer system as specified in claim 27 wherein the computing module further comprises graphics.

29. The computer system as specified in claim 21 wherein the connectivity station comprises a third interface, further comprising a second module having an interface coupled to the connectivity station third interface via a serial link and adapted to serially communicate with the computing module.

30. The computer system as specified in claim 29 wherein the second module comprises a peripheral device.

31. The computer system as specified in claim 21 wherein the first module comprises a processor.

32. The computer system as specified in claim 29 wherein the second module comprises a processor.

33. The computer system as specified in claim 29 wherein both the first and second modules are each comprised of a mobile computing device.

34. The computer system as specified in claim 21 wherein the connectivity station further comprises a third interface adapted to exchange serial data with a module selected from a group comprising of:
- a disk drive, a keyboard, a mouse, a monitor, a printer, an Internet connection, a wireless accessory, and a storage module.

35. The computer system as specified in claim 21 wherein the computing module is separated from the connectivity station by a distance of at least several meters.

36. A computer system, comprising:
- a first module having a first interface; and
- a second module having a second interface remotely positioned from and connected to the first interface and adapted to asynchronously, serially transfer bus information therebetween, wherein only one said module is required to have a computing module including a CPU to asynchronously, serially transfer said bus information therebetween.

37. The computer system as specified in claim 36, wherein the second interface comprises a bridge.

38. The computer system as specified in claim 37, further comprising a third module coupled to the first module and adapted to serially transfer said bus information therebetween.

39. The computer system as specified in claim 36 further comprising a third module coupled to the second module and adapted to serially transfer said bus information therebetween.

40. The computer system as specified in claim 36 wherein both the first module and the second module comprise a computing module, wherein the first and second modules are each adapted to transfer said bus information therebetween without handshaking.

41. The computer system as specified in claim 36 wherein the first module comprises a primary video display.

42. The computer system as specified in claim 41 wherein the second module comprises a secondary video display.

43. The computer system as specified in claim 41 wherein the first module also comprises a data entry device coupled to the primary video display.

44. The computer system as specified in claim 41 wherein the first module also comprises a common storage module.

45. The computer system as specified in claim 38 wherein the third module coupled to the first module is adapted to serially transfer said bus information therein without handshaking.

46. The computer system as specified in claim 39 wherein the third module coupled to the second module is adapted to serially transfer said bus information therebetween without handshaking.

47. The computer system as specified in claim 1, wherein the first connectivity station communicates with the first module over a single-level bridge.

48. The computer system as specified in claim 22, wherein the connectivity station communicates with the first module over a single-level bridge.

49. The computer system as specified in claim 37, wherein the second module communicates with the first module over a single-level bridge.

50. The computer system as specified in claim 1 wherein the first connectivity station communicates with the first module by sending bus information without waiting for an incoming acknowledgement before inaugurating transfer of the bus information therebetween.

51. The computer system as specified in claim 21 wherein the connectivity station communicates with the first module by sending bus information without waiting for an incoming acknowledgement before inaugurating transfer of the bus information therebetween.

52. The computer system as specified in claim 1 wherein the first connectivity station communicates with the first module by sending bus information without waiting for an incoming acknowledgement before inaugurating transfer of the bus information therebetween.

\* \* \* \* \*

UNITED STATES PATENT AND TRADEMARK OFFICE
CERTIFICATE OF CORRECTION

| | | |
|---|---|---|
| PATENT NO. | : 7,734,852 B1 | Page 1 of 1 |
| APPLICATION NO. | : 09/559678 | |
| DATED | : June 8, 2010 | |
| INVENTOR(S) | : Frank W. Ahern et al. | |

It is certified that error appears in the above-identified patent and that said Letters Patent is hereby corrected as shown below:

On page 3, column 1, line 10 under "Other Publications", delete "8 pages" and insert -- 6 pages -- therefor.

On page 3, column 1, line 13 under "Other Publications", delete "tosystem" and insert -- to-system -- therefor.

In column 1, line 7, delete "filed en" and insert -- filed -- therefor.

In column 10, line 26, in claim 14, delete "the data" and insert -- the parallel data -- therefor.

Signed and Sealed this

Fifth Day of October, 2010

David J. Kappos
*Director of the United States Patent and Trademark Office*